(12) United States Patent
Chen et al.

(10) Patent No.: US 9,496,788 B2
(45) Date of Patent: Nov. 15, 2016

(54) MULTI-PHASE BOOST CONVERTER WITH PHASE SELF-DETECTION AND DETECTING CIRCUIT THEREOF

(71) Applicant: ANPEC ELECTRONICS CORPORATION, Hsinchu (TW)

(72) Inventors: Yu-Yu Chen, Yunlin County (TW); Chih-Yuan Chen, Hsinchu (TW)

(73) Assignee: ANPEC ELECTRONICS CORPORATION, Hsinshu (TW)

( * ) Notice: Subject to any disclaimer, the term of this patent is extended or adjusted under 35 U.S.C. 154(b) by 14 days.

(21) Appl. No.: 14/727,725

(22) Filed: Jun. 1, 2015

(65) Prior Publication Data

US 2016/0261184 A1 Sep. 8, 2016

(30) Foreign Application Priority Data

Mar. 4, 2015 (TW) .............................. 104106843 A

(51) Int. Cl.
*H02M 3/158* (2006.01)
*H02M 3/156* (2006.01)

(52) U.S. Cl.
CPC ............. *H02M 3/158* (2013.01); *H02M 3/156* (2013.01)

(58) Field of Classification Search
CPC ...... H02M 1/32; H02M 1/42; H02M 1/4216; H02M 3/156; H02M 3/158; H02M 3/1582; H02M 3/1584
See application file for complete search history.

(56) References Cited

U.S. PATENT DOCUMENTS

| 6,674,274 B2 * | 1/2004 | Hobrecht | H02J 1/102 323/268 |
| 7,602,624 B2 * | 10/2009 | Nakashima | H02M 3/1584 323/225 |
| 7,948,222 B2 * | 5/2011 | Hardman | H02M 3/1584 323/272 |
| 2012/0242299 A1 * | 9/2012 | Xu | H02M 1/4216 323/210 |

* cited by examiner

*Primary Examiner* — Matthew Nguyen
(74) *Attorney, Agent, or Firm* — Li&Cai Intellectual Property (USA) Office

(57) ABSTRACT

A multi-phase boost converter with phase self-detection and a detecting circuit thereof are provided. The multi-phase boost converter comprises M switching circuits, a capacitor, a control circuit and a detecting circuit. Each switching circuit has an input end and an output end. N inductors are coupled in parallel between the input ends and an input voltage. The output ends are coupled to an output voltage. The control circuit controls the conduction status of the switching circuits according to a feedback voltage corresponding to the output voltage. The detecting circuit coupled between the input ends and the control circuit detects the conduction status between the input voltage and each of the input ends, for outputting a first control signal. The control circuit controlled by the first control signal selectively controls at least one of the switching circuits. N is a positive integer less than or equal to M.

16 Claims, 7 Drawing Sheets

MULTI-PHASE BOOST CONVERTER WITH PHASE SELF-DETECTION AND DETECTING CIRCUIT THEREOF

BACKGROUND OF THE INVENTION

1. Field of the Invention

The instant disclosure relates to a multi-phase boost converter with phase self-detection and a detecting circuit thereof; in particular, to a multi-phase boost converter with phase self-detection and a detecting circuit thereof which can determine whether to control the switching transistors of each phase by detecting if an inductor of each phase of the multi-phase boost converter exists, so as to decrease unnecessary power consumption.

2. Description of Related Art

An electronic device usually contains various different elements, and the operation voltage of each element may also be different. Thus, in the electronic device, a DC to DC voltage converter is needed to achieve the regulation of the voltage level (rising the voltage or decreasing the voltage), such that each element can receive a stable voltage level. Depending on different power requirements, a variety of DC/DC voltage converters are proposed. However, all proposed voltage converters come from improvement of the buck/step down converter and the boost/step up converter. The buck converter decreases the DC voltage of the input end to a preset voltage level, and the boost converter increases the DC voltage of the input end.

Please refer to FIG. 1, FIG. 1 shows a circuit diagram of a conventional single-phase boost converter. A single-phase boost converter 1 comprises an inductor $L_1$, a first switch $LG_1$, a second switch $UG_1$, a capacitor 11, a feedback circuit 13 (which can be a voltage dividing circuit composed of some resistors), and a pulse width modulation (PWM) controller 15. The PWM controller 15 obtains a feedback voltage generated based on the output voltage VOUT from a feedback node 101 of a feedback circuit 13, and the PWM controller 15 controls the conduction/cut-off status of the first switch $LG_1$ and the second switch $UG_1$ according to the feedback voltage, for adjusting the voltage level of the output voltage VOUT.

For example, when the single-phase boost converter 1 finds out that the output voltage VOUT is less than a specific voltage level, the single-phase boost converter 1 will enter the boost mode. At the same time, the second switch $UG_1$ will be cut-off, and the first switch $LG_1$ will be conducted, such that the input voltage Vin will charge the inductor $L_1$. Then, the second switch $UG_1$ will be conducted, the first switch $LG_1$ will be turned off, and the inductor $L_1$ will charge the capacitor 11, such that the output voltage VOUT will rise to another specific voltage (which is greater than the voltage level of the input voltage Vin).

Then, please refer to FIG. 2 showing a circuit diagram of a conventional multi-phase boost converter. A multi-phase boost converter 2 comprises inductors $L_1$~$L_n$, first switch $LG_1$~$LG_n$, second switch $UG_1$~$UG_n$, a capacitor 11, a feedback circuit 13 and a PWM controller 15. The multi-phase boost converter 2 shown in FIG. 2 can be considered as n of the single-phase boost converters 1 shown in FIG. 1 connected in parallel in equivalence. Therefore, the input current of the multiphase boost converter 2 is actually the summation of the currents of the n inductors $L_1$~$L_n$. And, the current ripples of the n inductors $L_1$~$L_n$ may be out of phase to a certain degree, such that the ripple of currents of the n inductors $L_1$~$L_n$ may be cancelled by each other. In other words, for the conventional boost converter, by increasing the number the phases of the boost converters, the effect of decreasing the input current ripple and the output voltage ripple caused by the inductors can be achieved, and this favors high power applications.

In summary, multi-phase boost converter has higher reliability and efficiency compared to the single-phase boost converter, such that the multi-phase boost converter has become one of the mainstream applications. However, in a low power operation environment, there is no need to apply a large input current. Therefore the user may apply a certain manner to cease the operation of some phases where the inductors are disconnected, thus the related operation quiescent current of circuitry and the corresponding switching loss can be saved. Referring to FIG. 2 as an example, the amount of the inductors $L_1$~$L_n$ can be removed in order to reduce component costs in low power operation environment. However, the phase without inductor still switches, therefore, the related operation quiescent current of circuitry is then wasted and of course the corresponding switching loss is not saved. If one or some inductor are intentionally removed, the conventional multi-phase boost converter 2 does not provide any internal control mechanism for detecting its inductors $L_1$~$L_n$, for determining whether any or some of the inductors $L_1$~$L_n$ have been removed (for example, the inductor is opened). Thus, the PWM controller 15 still controls the first switch $LG_1$~$LG_n$ and the second switch $UG_1$~$UG_n$, so as to result in unnecessary power consumption.

SUMMARY OF THE INVENTION

The object of the instant disclosure is to provide a multi-phase boost converter with phase self-detection and a detecting circuit.

In order to achieve the aforementioned objects, according to an embodiment of the instant disclosure, a multi-phase boost converter with phase self-detection is provided. The multi-phase boost converter with phase self-detection comprises M switching circuits, a capacitor, a control circuit and a detecting circuit. Each of the switching circuits has an input end and an output end. N inductors are respectively coupled in parallel between the input ends and an input voltage, and the output nodes are coupled to an output voltage. The capacitor is coupled between the output voltage and a grounding voltage. The control circuit controls conduction/cut-off status of the switching circuits according to a feedback voltage corresponding to the output voltage. The detecting circuit is coupled between the input ends and the control circuit. The detecting circuit detects the conduction status between the input voltage and each of the input ends, for outputting a first control signal accordingly. The control circuit selectively controls at least one of the switching circuits according to the first control signal. M is a positive integer which is greater than one. N is a positive integer less than or equal to M.

In order to achieve the aforementioned objects, according to an embodiment of the instant disclosure, a detecting circuit is provided. The detecting circuit provides the operation of phase self-detection of a multi-phase boost converter. The multi-phase boost converter with phase self-detection comprises M switching circuits, a capacitor, a control circuit and a detecting circuit. Each of the switching circuits has an input end and an output end. N inductors are respectively coupled in parallel between the input ends and an input voltage, and the output nodes are coupled to an output voltage. The capacitor is coupled between the output voltage and a grounding voltage. The control circuit controls conduction/cut off status of the switching circuits according to a feedback voltage corresponding to the output voltage. The detecting circuit is coupled between the input ends and the control circuit. The detecting circuit detects the conduction status between the input voltage and each of the input ends, for outputting a first control signal accordingly. The control circuit selectively controls at least one of the switching circuits according to the first control signal. M is a positive integer which is greater than one. N is a positive integer less than or equal to M.

In summary, the provided multi-phase boost converter with phase self-detection and the detecting circuit can determine whether to control the switching transistors of each phase according to detecting whether an inductor at the corresponding phase exists. Accordingly, the PWM controller of the multi-phase boost converter does not need to perform related control about the switching transistors of the phase without coupling an inductor, so as to achieve reduced excess power consumption.

In order to further the understanding regarding the instant disclosure, the following embodiments are provided along with illustrations to facilitate the disclosure of the instant disclosure.

DETAILED DESCRIPTION OF THE PREFERRED EMBODIMENTS

Figure 1:
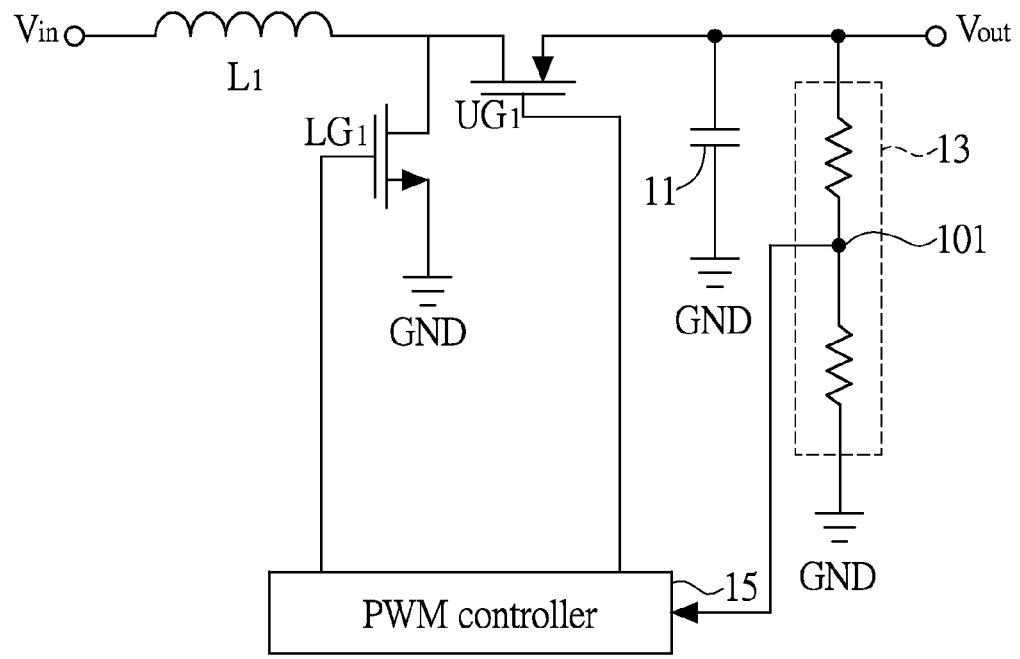
FIG. 1 shows a circuit diagram of a conventional single-phase boost converter.

Reference will now be made in detail to the exemplary embodiments of the present disclosure, examples of which are illustrated in the accompanying drawings. Wherever possible, the same reference numbers are used in the drawings and the description to refer to the same or like parts.

Figure 3:
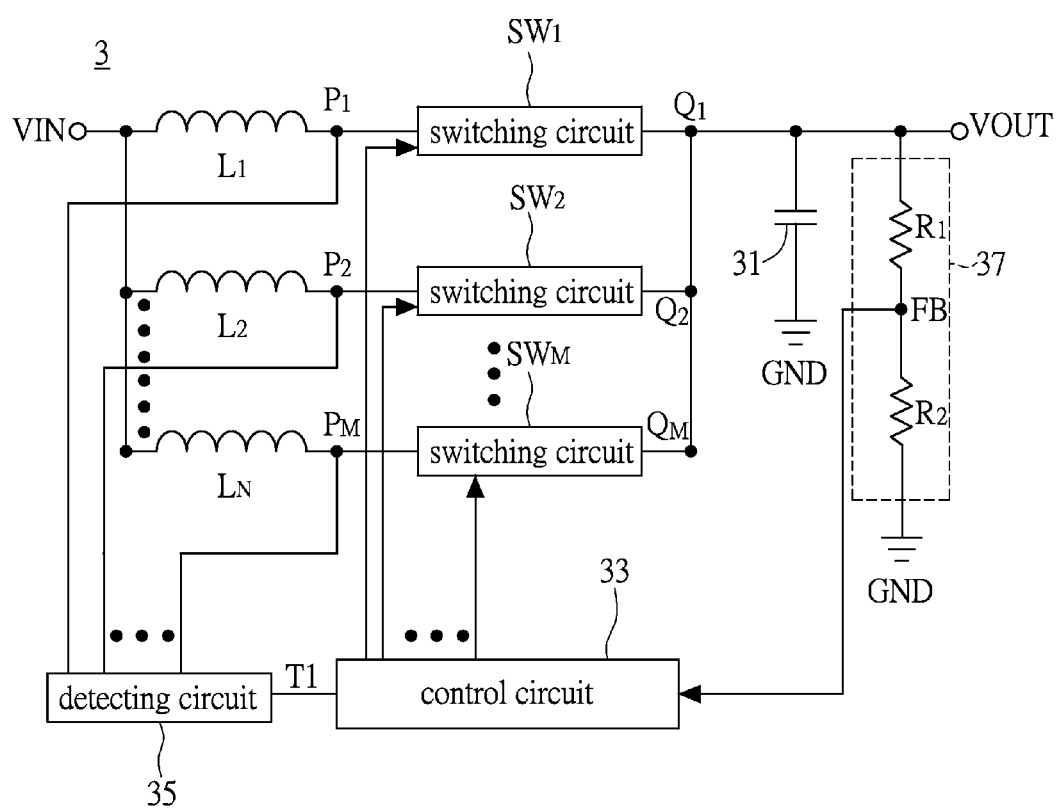
FIG. 3 shows a block diagram of a multi-phase boost converter with phase self-detection according to an embodiment of the instant disclosure.

Firstly, please refer to FIG. 3 showing a block diagram of a multi-phase boost converter with phase self-detection according to an embodiment of the instant disclosure. The multi-phase boost converter 3 comprises M switching circuits $SW_1 \sim SW_M$, a capacitor 31, a control circuit 33 and a detecting circuit 35. The switching circuits $SW_1 \sim SW_M$, the capacitor 31, a control circuit 33 and the detecting circuit 35 can be implemented completely by a hardware circuit, or implemented by hardware cooperating with firmware or software. In short, the instant disclosure does not limit the implementation manner of the multi-phase boost converter 3. Additionally, the switching circuits $SW_1 \sim SW_M$, the capacitor 31, the control circuit 33 and the detecting circuit 35 can be integrated or arranged individually, but the instant disclosure is not so restricted.

In detail, each of the switching circuits $SW_M$ has an input end $P_M$ and an output end $Q_M$. N inductors $L_1 \sim L_N$ are respectively coupled in parallel between the input ends $P_1 \sim P_M$ and an input voltage VIN (that is, there exists an inductor $L_j$ coupled between the input end Pi and the input voltage VIN, or the input end $P_i$ and the input voltage VIN may be opened, wherein i is an integer between 1 and M, and j is an integer between 1 and N). The output nodes $Q_1 \sim Q_M$ are commonly coupled to an output voltage VOUT. Additionally, the capacitor 31 is coupled between the output voltage VOUT and a grounding voltage GND. The control circuit 33 is used to control conduction/cut off status of the switching circuits $SW_1 \sim SW_M$ according to a feedback voltage generated corresponding to the output voltage VOUT. The detecting circuit 35 is coupled between each of the input ends $P_1 \sim P_M$ and the control circuit 33. The detecting circuit 35 detects the conduction status of each of the input ends $P_1 \sim P_M$, for outputting a first control signal T1 accordingly. Then, the control circuit 33 selectively controls at least one of the switching circuits $SW_1 \sim SW_M$ according to the first control signal T1.

Based on above description, an artisan of ordinary skill in the art will appreciate that the switching circuits $SW_1 \sim SW_M$ can respectively represent the phases of the multi-phase boost converter 3, where M is a positive integer which is greater than one. And, as mentioned above, in some low power application environment, the user may apply a certain manner to cease the operation of some phases where the inductors are disconnected, thus the corresponding switching loss can be saved. Therefore, the total number N of the inductors $L_1 \sim L_N$ can be a positive integer less than or equal to M.

Figure 2:
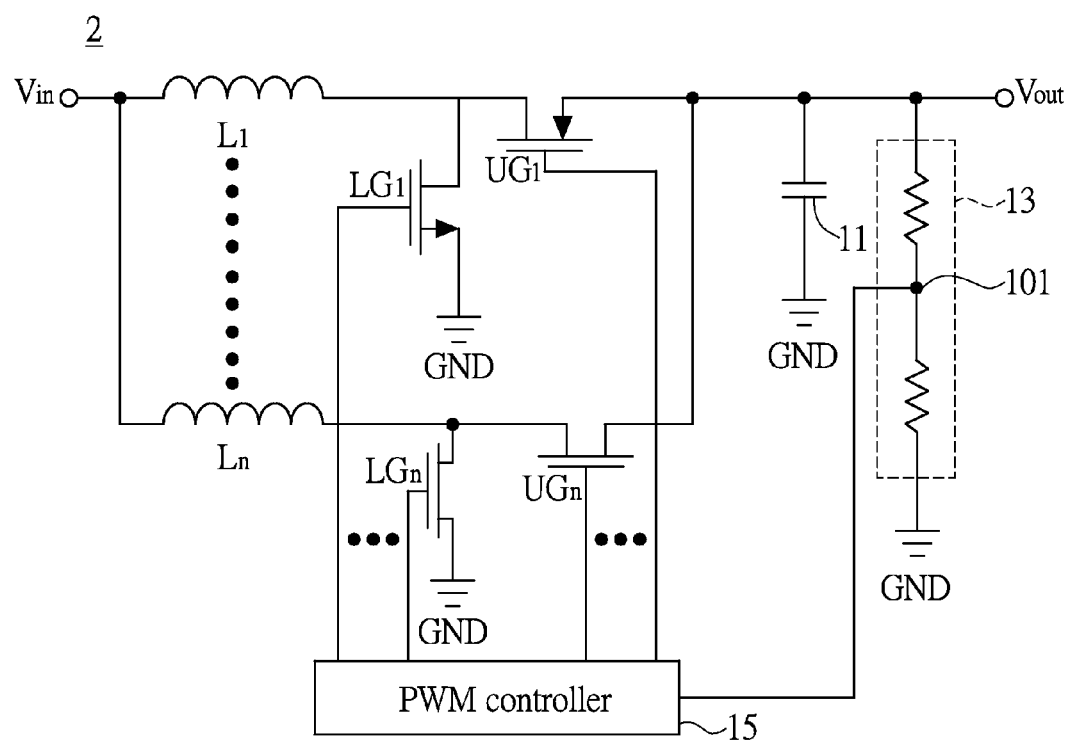
FIG. 2 shows a circuit diagram of a conventional multi-phase boost converter.

For example, in the case of M equals to 4 and N equals to 2, the multi-phase boost converter 3 is presented as a boost converter having four phases switching circuits $SW_1 \sim SW_4$. In the ideal condition, the switching circuits $SW_1 \sim SW_4$ should be respectively coupled to the four inductors $L_1 \sim L_4$ as inputs. However, only two switching circuits $SW_1 \sim SW_2$ are respectively coupled to the inductors $L_1 \sim L_2$ as inputs, and the other switching circuits $SW_3 \sim SW_4$ are not coupled to the inductors $L_3 \sim L_4$ as inputs. As mentioned above, in this case, the conventional multi-phase boost converter 2 does not provide any internal mechanism to detect the inductors $L_1 \sim L_4$, for determining that the inductors $L_3 \sim L_4$ are opened. Therefore, the PWM controller 15 shown in FIG. 2 will still control the conduction/cut-off status of the switching transistors at all phases. Thus, the conventional multi-phase boost converter 2 conducts unnecessary power consumption for the switching phase not required.

On the contrary, the main concept of the multi-phase boost converter 3 in the instant disclosure is determining whether the inductors $L_1 \sim L_4$ in each phase exist or not, by determining whether the input ends $P_1 \sim P_M$ and the input voltage VIN are conducted or not (open), so as to make the control circuit 33 determine whether to control conduction/cut-off status of the switching circuits $SW_1 \sim SW_4$ at each phase. That is, when the detecting circuit 35 of the instant disclosure determines that the inductors $L_3 \sim L_4$ do not exist (indicated by only switching circuits $SW_1 \sim SW_2$ respectively coupling to inductors $L_1 \sim L_2$ as inputs), the detecting circuit 35 will output the related first control signal T1 to inform the control circuit 33 for turning-off the control of the switching circuit $SW_3 \sim SW_4$ corresponding to the phases not required to be switched. Therefore, compared to the conventional multiple-phases boost converter 2 shown in FIG. 2, the multi-phase boost converter 3 of the instant disclosure can further achieve the purpose of decreasing unnecessary power consumption.

Figure 4:
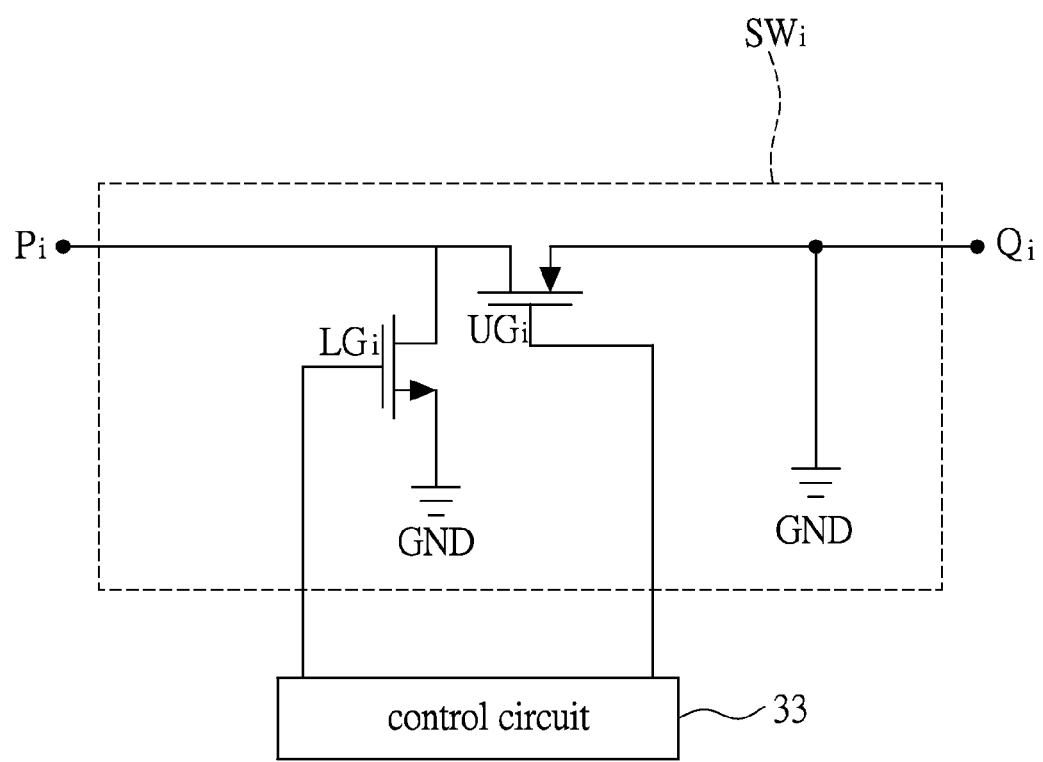
FIG. 4 shows a circuit diagram of a switching circuit of a multi-phase boost converter with phase self-detection according to an embodiment of the instant disclosure.

Additionally, based on the above description, an artisan of ordinary skill in the art will understand several types of embodiments for the switching circuits $SW_1 \sim SW_4$. For example, please refer to FIG. 4 showing a circuit diagram of a switching circuit of a multi-phase boost converter with phase self-detection according to an embodiment of the instant disclosure. Some elements in FIG. 4 being the same or similar to elements of FIG. 3 presented by the same reference numbers, the redundant information is not repeated. The switching circuit $SW_i$ comprises a first switching transistor $LG_i$ and a second switching transistor $UG_i$. A drain end and a source end of the first switching transistor $LG_i$ are respectively coupled to the input end Pi and the grounding end GND, and a gate end of the first switching transistor $LG_i$ is coupled to the control circuit 33, wherein the first switching transistor $SW_i$ is controlled by the control circuit 33 to determine its conducting/cut-off status. A drain end and a source end of the second switching transistor $UG_i$ are respectively coupled to the input end Pi and the output end Qi, and a gate end of the second switching transistor $UG_i$ is coupled to the control circuit 33. The second switching transistor $UG_i$ is also controlled by the control circuit 33. But, the conduction/cut-off status of the second switching transistor $UG_i$ is opposite to the status of the first switching transistor $LG_i$. Specifically, the first switching transistor $LG_i$ can be an N-channel MOSFET, and the second switching transistor $UG_i$ can be a P-channel MOSFET in practice. In short, the instant disclosure is not limited to the implementations of the first switching transistor $LG_i$ and the second switching transistor $UG_i$, and an artisan of ordinary skill in the art can design the transistors by requirements for practical applications.

Furthermore, the control circuit 33 controls the conduction/cut-off status of the first switching transistor $LG_i$ and the second switching transistor $UG_i$ according to the feedback voltage corresponding to the output voltage VOUT. Thus, please refer to FIG. 3 showing a block diagram of a multi-phase boost converter with phase self-detection according to an embodiment of the instant disclosure. The multi-phase boost converter 3 further comprises a feedback circuit 37. The feedback circuit 37 is coupled between the output voltage VOUT and the control circuit 33, for outputting the corresponding feedback voltage to the control circuit 33 according to the voltage value of the output voltage VOUT. In practice, the feedback circuit 37 can be a voltage dividing circuit implemented by two resistors R1 and R2 connected in series, wherein the resistor R1 is coupled between the output voltage VOUT and the feedback node FB, and the resistor R2 is coupled between the feedback node FB and the grounding voltage GND. The feedback circuit 37 divides the voltage of the output voltage VOUT to generate the corresponding feedback voltage at the feedback node FB. It is worth mentioning that this disclosure does not limit the implementation of the feedback circuit 37, and an artisan of ordinary skill in the art can design the transistors by requirement and practical applications.

Figure 5:
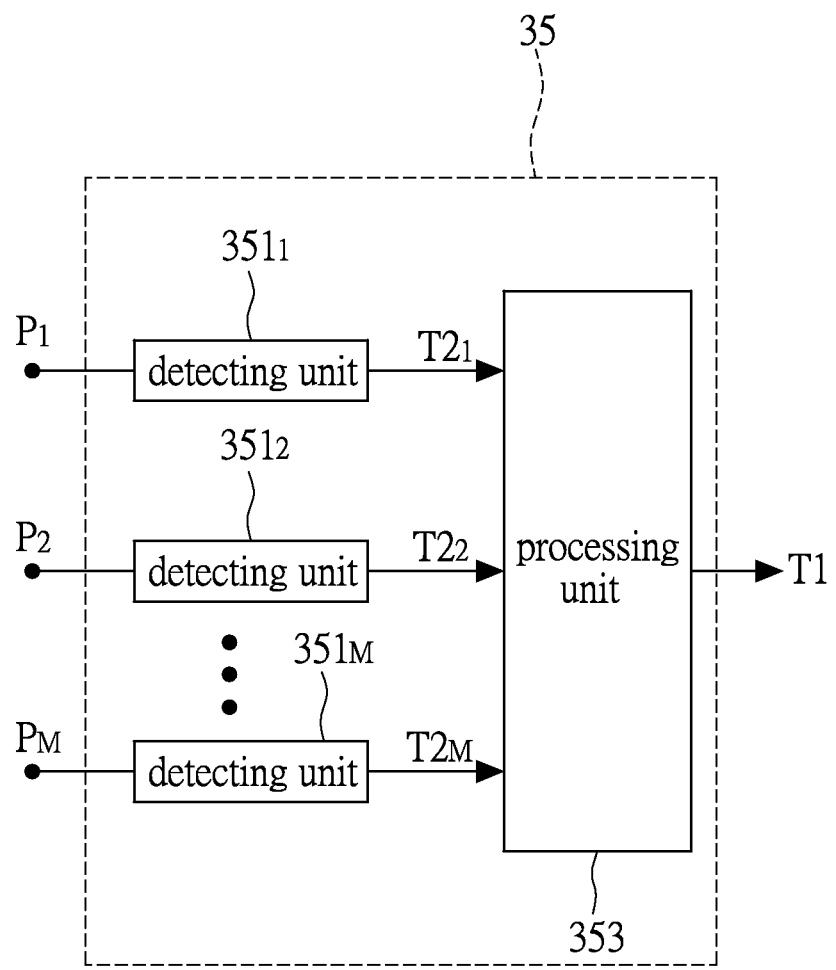
FIG. 5 shows a block diagram of a detecting circuit of a multi-phase boost converter with phase self-detection according to an embodiment of the instant disclosure.

On the other hand, for further describing details of the detecting circuit 35 of the multi-phase boost converter 3, this instant disclosure provides an exemplary embodiment of the detecting circuit 35. Please refer to FIG. 5 showing a block diagram of a detecting circuit of a multi-phase boost converter with phase self-detection according to an embodiment of the instant disclosure. However, the following descriptions only illustrate a detailed embodiment of the detecting circuit 35 of the multi-phase boost converter 3, and the instant disclosure is not so restricted. The given detecting circuit 35 in this embodiment can be operated in the multi-phase boost converter 3 shown in FIG. 3, thus please refer to FIG. 3 in conjunction with FIG. 5 to benefit comprehension. Some elements in FIG. 5 being the same or similar to elements of FIG. 3 are presented by the same reference numbers, thus the redundant information is not repeated.

In detail, the detecting circuit 35 comprises M detecting units $351_1 \sim 351_M$ and a processing unit 353. The detecting units are sequentially coupled to one of the input ends $P_1 \sim P_M$ of the switching circuits $SW_1 \sim SW_M$, and each detecting unit $351_1 \sim 351_M$ determines whether the input ends $P_1 \sim P_M$ and the input voltage VIN are conducted with each other, for respectively outputting the second control signals $T2_1 \sim T2_M$ accordingly. The processing unit 353 is coupled between the detecting units $351_1 \sim 351_M$ and the control circuit 33. The processing unit 353 is used for converting the received second control signals $T2_1 \sim T2_M$ to the first control signal T1 presented in M bits and outputting the first signal T1 to the control circuit 33.

Because the detecting circuit 35 is mainly used to determine whether the input ends $P_1 \sim P_M$ and the input voltage VIN are conducted with each other, this detecting circuit 35 comprises M detecting units $351_1 \sim 351_M$ whose amount is equal to the amount of the input ends $P_1 \sim P_M$, and each detecting unit $351_1 \sim 351_M$ only determines whether the corresponding input end $P_1 \sim P_M$ and the input voltage VIN are conducted with each other. Then, the processing unit 353 receives the determination results of the detecting units $351_1 \sim 351_M$ (which is the second control signal $T2_1 \sim T2_M$) and sequentially organizes the received determination results to the first control signal T1.

Therefore, according to above descriptions, an artisan of ordinary skill in the art will appreciate that the mentioned determination of whether corresponding input ends $P_1 \sim P_M$ and the input voltage VIN are conducted with each other can be used to determine whether the input ends $P_1 \sim P_M$ are respectively coupled to a corresponding inductor. For example, when the detecting unit $351_1$ corresponding to the input end $P_1$ is not conducted with the input voltage VIN, it indicates that the input end $P_1$ is not coupled to a corresponding inductor, thus the switching circuit $SW_1$ of the input end $P_1$ would not require to be switched, and the detecting circuit 35 can further inform the control circuit 33 for turning off any control of the switching circuit $SW_1$.

In practice, each of the detecting units $351_1 \sim 351_M$ outputs the second control signal $T2_1 \sim T2_M$ with voltage level of logic high voltage level to the processing unit 353 when the detecting unit $(351_1 \sim 351_M)$ determines the corresponding input end $P_1 \sim P_M$ and the input voltage VIN are conducted with each other or, each of the detecting units $351_1 \sim 351_M$ outputs the second control signal $T2_1 \sim T2_M$ with voltage level of logic low voltage level to the processing unit 353 when the detecting unit $(351_1 \sim 351_M)$ determines the corresponding input end $P_1 \sim P_M$ and the input voltage VIN are not conducted with each other. However, the mentioned embodiment is only an example, and the instant disclosure is not restricted thereto.

Further, the second control signal $T2_1 \sim T2_M$ represents whether the corresponding input ends $P_1 \sim P_M$ are coupled to a corresponding inductor. Therefore, when the number of the phases of the multi-phase boost converter 3 increases, the second control signal $T2_1 \sim T2_M$ generated by the detecting circuit 35 would increase correspondingly. The processing unit 353 can use digitalized data to represent the results of whether each of the input ends $P_1$~$P_M$ is respectively coupled to its corresponding inductor. For example, when considering the multi-phase boost converter 3 being a boost converter having switching circuits $SW_1$~$SW_4$ of four phases, if only switching circuits $SW_1$~$SW_2$ of the first two phases are respectively coupled to the corresponding inductors, and switching circuits $SW_3$~$SW_4$ of the last two phases are not respectively coupled to the corresponding inductors, then the voltage levels of the second control signals $T2_1$~$T2_4$ generated by the detecting unit $351_1$~$351_4$ corresponding to the switching circuits $SW_1$~$SW_4$ can be indicated as: logic high voltage level, logic high voltage level, logic low voltage level, and logic low voltage level.

Then, the processing unit 353 sequentially determines the bit values of M bits of the first control signal T1 according to the voltage levels of the second control signals $T2_1$~$T2_4$ which can be logic high voltage level or logic low voltage level. For example, when the second control signal $T2_k$ is logic high voltage level, the processing unit 353 decides the bit value of k bit of the first control signal T1 to be 1 (in this example, k is an integer between 1 and 4). On the contrary, when the second control signal $T2_k$ is logic low voltage level, the processing unit 353 decides the bit value of k bit of the first control signal T1 to be 0. Therefore, the first control signal T1 arranged by the processing unit 353 based on the detection results of the detecting units $351_1$~$351_4$ can be indicated as: 1100. Thereafter, due to the outcome of the first control signal T1, the control circuit 33 only controls conduction/cut-off status of the switching circuit $SW_1$~$SW_2$ for the first two phases being coupled to the corresponding inductors. That is, the control circuit 33 turns off any control for the switching circuits $SW_3$~$SW_4$ which are not coupled to the corresponding inductors. It is worth mentioning that the above mentioned embodiment is only for example, but the instant disclosure is not so restricted.

Figure 6:
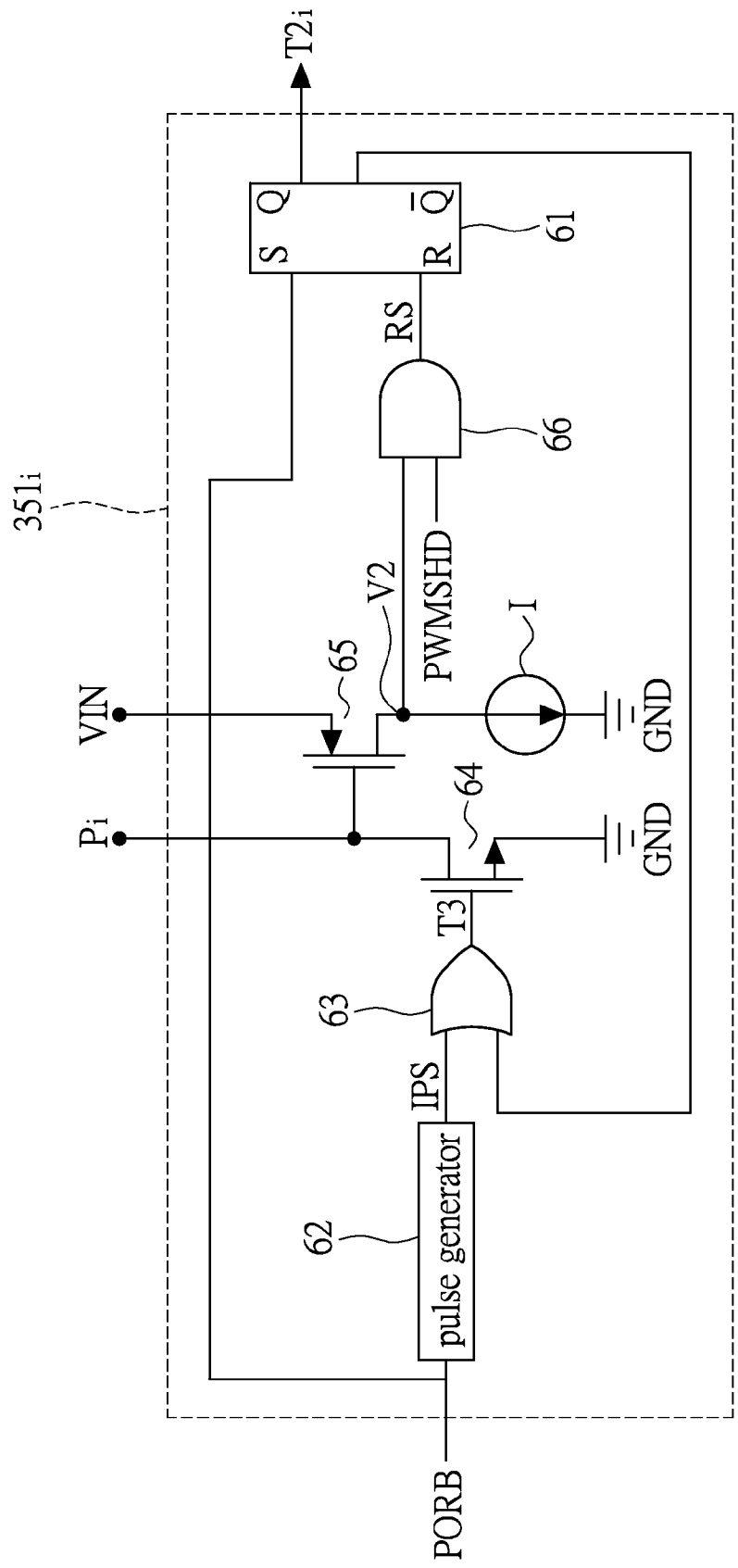
FIG. 6 shows a circuit diagram of a detecting unit of a multi-phase boost converter with phase self-detection according to an embodiment of the instant disclosure.

On the other hand, in order to further describe the details of the detecting unit, an embodiment of the detecting unit is disclosed. Please refer to FIG. 6, FIG. 6 shows a circuit diagram of a detecting unit of a multi-phase boost converter with phase self-detection according to an embodiment of the instant disclosure. However, the following embodiment is only one detailed implementation of the detecting unit in the detecting circuit. The instant disclosure is not so restricted. Some elements in FIG. 6 being the same or similar to some elements of FIG. 3 and FIG. 5 presented by the same reference numbers, thus the redundant information is not repeated.

Please refer to FIG. 3 in conjunction with FIG. 5 and FIG. 6 to be benefit comprehension. The detecting unit $351_i$ comprises an RS flip-flop 61, a pulse generator 62, an OR gate 63, a third switching transistor 64, a fourth switching transistor 65, and an AND gate 66. Additionally, the mentioned elements can be integrated or arranged individually, and the instant disclosure is not so restricted.

Specifically, a set end of the RS flip-flop 61 receives a first enable signal PORB, and a reset end of the RS flip-flop 61 receives a reset signal RS. When the reset signal RS is not true (also called "false"), a positive output end of the RS flip-flop 61 outputs the second control $T2_i$ with voltage level of logic high. Based on the above descriptions, an artisan of ordinary skill in the art will appreciate that the default output second control signal $T2_i$ of the RS flip-flop 61 is logic high voltage level, initially. In other words, before the detecting unit $351_i$ starts to determine whether the related input end Pi and the input voltage VIN are conducted with each other, the detecting unit $351_i$ is preset as considering the input end Pi is coupling to the corresponding inductor. Thus, during the judging process, when the detecting unit $351_i$ finds out the input end Pi is not coupled to its corresponding inductor, the detecting unit $351_i$ then controls the RS flip-flop to output the second control signal $T2_i$ with logic low voltage level due to the input reset signal RS being true.

Additionally, by the way, the first enable signal PORB is mainly for triggering the detecting unit $351_i$ to start determining whether the related input end Pi and the input voltage VIN are conducted with each other. Thus, the first enable signal PORB can be provided by a certain element in the multi-phase boost converter 3 or an external element outside the multi-phase boost converter 3, but the instant disclosure is not so restricted. Also, the instant disclosure does not limit the details of the implementation of the first enable signal PORB triggering the detecting unit $351_i$ for executing judgment of conduction, and an artisan of ordinary skill in the art can design according to requirement and practical applications. For example, in a practical case, the first signal PROB can generate a falling edge when the voltage of the input voltage VIN reaches a certain threshold (for example, 2.4V), for triggering the detecting unit $351_i$ to start to determine whether the input end Pi and the input voltage VIN are conducted with each other. However, the mentioned embodiment is only an example, and the instant disclosure is not restricted thereto.

Further, the pulse generator 62 is used to output a pulse signal IPS according to a falling edge trigger of the first enable signal PORB. The OR gate 63 is used for outputting a third control signal T3 according to the pulse signal IPS and the output signal of an inverted output end of the RS flip-flop 61.

Additionally, a drain end and a source end of the third switching transistor 64 are respectively coupled to the corresponding input end Pi and the grounding voltage GND. A gate end of the third switching transistor 64 is controlled by the third control signal T3 for determining the conduction/cut-off status of the third switching transistor 64. A drain end and a source end of the fourth switching transistor 65 are respectively coupled to a current source I and the input voltage VIN. A gate end of the fourth switching transistor 65 is coupled to the corresponding input end Pi. The fourth switching transistor 65 is controlled by the signal on the corresponding input end Pi for determining the conduction/cut-off status of the fourth switching transistor 65. An AND gate 66 is used for outputting the reset signal RS according to the signal on the drain end of the fourth switching transistor 65 and a second enable signal PWM-SHD. The mentioned second enable signal PWMSHD can be considered as a signal changed according to the increase of the input voltage VIN, and the second enable signal PWMSHD is turned off after the start-up process of the multi-phase boost converter 3 is completed.

Figure 7:
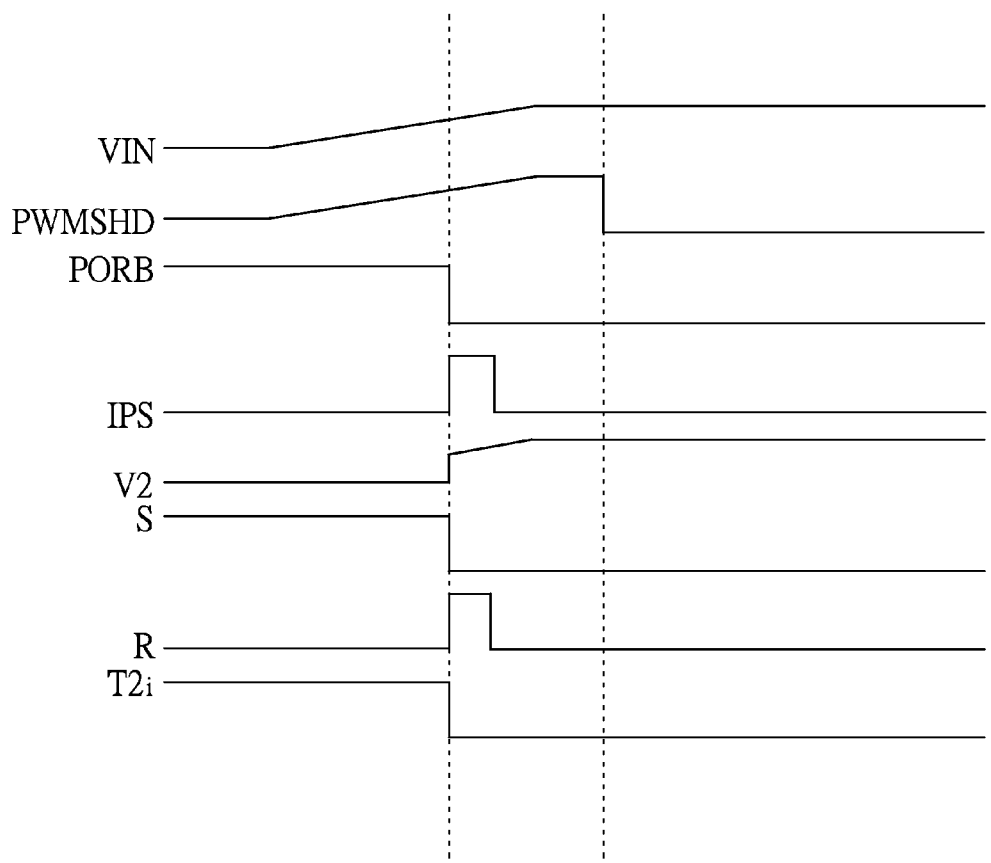
FIG. 7 shows a waveform diagram of the operation of a detecting unit of a multi-phase boost converter with phase self-detection according to an embodiment of the instant disclosure.

For further describing the detailed operation process of the detecting unit $351_i$, one more figure is illustrated to explain that how the detecting unit $351_i$ determines whether the corresponding input end $P_i$ and the input voltage VIN are conducted with each other, for generating the second control signal $T2_i$. Please refer to FIG. 7, FIG. 7 shows a waveform diagram of the operation of a detecting unit of a multi-phase boost converter with phase self-detection according to an embodiment of the instant disclosure. The waveform shown in FIG. 7 is the waveform of the detecting unit $351_i$ during operation, thus please refer to FIG. 3 in conjunction with FIG. 6 and FIG. 7.

Firstly, when the multi-phase converter 3 is starting up, the voltage of the input voltage VIN goes up. When the input voltage VIN reaches a certain threshold (for example, 2.4V), the first enable signal PORB is caused to generate a falling edge. At the same time, the falling edge of the first enable signal PORB can trigger the pulse generator 62 to generate the pulse signal IPS.

Therefore, when the corresponding input end Pi of the detecting unit 351 is not coupled to the corresponding inductor, the fourth switching transistor 65 receives the gate signal which is logic low voltage level. At the same time, the fourth switching transistor 65 is conducted according to its gate signal, such that one of two input ends of the AND gate 66 can receive the voltage of the input voltage VIN, and another input end of the AND gate 66 can receive the second enable signal PWMSHD. It can be seen, the signals of two input ends of the AND gate 66 are both logic high voltage level, such that the AND gate 66 can generate the reset signal RS which is true. Therefore, according to the input reset signal RS which is true, the RS flip-flop 61 can output the second control signal T2$_i$ with logic low voltage level. The mentioned embodiment is only an example, and the instant disclosure is not restricted thereto.

According to above descriptions, the provided multi-phase boost converter with phase self-detection and the detecting circuit of the instant disclosure can determine whether to control the switching transistor of each phase by detecting whether an inductor at the corresponding phase exists. Accordingly, the PWM controller of the multi-phase boost converter does not need to perform related control about the switching transistor of the phase without coupling an inductor, so as to achieve reduced excess power consumption.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A multi-phase boost converter with phase self-detection, comprising:
    M switching circuits, each of the switching circuits having an input end and an output end, wherein N inductors are respectively coupled in parallel between the input ends and an input voltage, and the output ends are coupled to an output voltage;
    a capacitor, coupled between the output voltage and a grounding voltage;
    a control circuit, controlling conduction/cutoff status of the switching circuits according to a feedback voltage corresponding to the output voltage; and
    a detecting circuit, coupled between the input ends and the control circuit, the detecting circuit detecting the conduction status between the input voltage and each of the input ends, for outputting a first control signal accordingly;
    wherein the control circuit selectively controls at least one of the switching circuits according to the first control signal, M is a positive integer which is greater than one, N is a positive integer less than or equal to M.

2. The multi-phase boost converter with phase self-detection according to claim 1, wherein each of the switching circuits comprising:
    a first switching transistor, a drain end and a source end of the first switching transistor respectively coupled to the input end and the grounding end, a gate end of the first switching transistor coupled to the control circuit, wherein the first switching transistor is controlled by the control circuit to determine the conducting/cut-off status of the first switching transistor; and
    a second switching transistor, a drain end and a source end of the second switching transistor respectively coupled to the input end and the output end, a gate end of the second switching transistor coupled to the control circuit, wherein the second switching transistor is controlled by the control circuit, and the conduction/cut-off status of the second switching transistor is opposite to the status of the first switching transistor.

3. The multi-phase boost converter with phase self-detection according to claim 2, wherein the first switching transistor is an N-channel MOSFET.

4. The multi-phase boost converter with phase self-detection according to claim 3, wherein the second switching transistor is a P-channel MOSFET.

5. The multi-phase boost converter with phase self-detection according to claim 1, wherein the multi-phase boost converter further comprises:
    a feedback circuit, coupled between the output voltage and the control circuit, for outputting the corresponding feedback voltage according to the voltage value of the output voltage.

6. The multi-phase boost converter with phase self-detection according to claim 1, wherein the detecting circuit comprises:
    M detecting units, wherein the detecting units are sequentially coupled to one of the input end, and each detecting unit detects the conduction status of the corresponding input end, for outputting a second control signal accordingly; and
    a processing unit, coupled between the detecting units and the control circuit, the processing unit converting the received second control signals to the first control signal presented in M bits and outputting the first signal to the control circuit.

7. The multi-phase boost converter with phase self-detection according to claim 6, wherein each of the detecting units outputs the second control signal with voltage level of logic high voltage level to the processing unit when the detecting unit determines the corresponding input end and the input voltage are conducted with each other, each of the detecting units outputs the second control signal with voltage level of logic low voltage level to the processing unit when the detecting unit determines the corresponding input end and the input voltage are not conducted with each other.

8. The multi-phase boost converter with phase self-detection according to claim 7, wherein the processing unit sequentially determines the bit values of M bits of the first control signal according to the voltage levels of the second control signals which is logic high voltage level or logic low voltage level.

9. The multi-phase boost converter with phase self-detection according to claim 8, wherein each detecting unit comprises:
    a RS flip-flop, a set end and a reset end of the RS flip-flop respectively receiving a first enable signal and a reset signal, a positive output end of the RS flip-flop outputting the second control with voltage level of logic high voltage level when the reset signal is not true;
    a pulse generator, outputting a pulse signal according to a falling edge trigger of the first enable signal;
    a OR gate, outputting a third control signal according to the pulse signal and the output signal of an inverted output end of the RS flip-flop;

a third switching transistor, a drain end and a source end of the third switching transistor respectively coupled to the corresponding input end and the grounding voltage, a gate end of the third switching transistor being controlled by the third control signal for determining the conduction/cut-off status of the third switching transistor;

a fourth switching transistor, a drain end and a source end of the fourth switching transistor respectively coupled to a current source and the input voltage, a gate end of the fourth switching transistor coupled to the corresponding input end, the fourth switching transistor being controlled by the signal on the corresponding input end for determining the conduction/cut-off status of the fourth switching transistor; and an AND gate, outputting the reset signal according to the signal on the drain end of the fourth switching transistor and a second enable signal.

10. The multi-phase boost converter with phase self-detection according to claim 9, wherein the first enable signal is used to generate a falling edge when the voltage of the input voltage reaches a first threshold.

11. A detecting circuit, providing the operation of phase self-detection of a multi-phase boost converter, and the multi-phase boost converter with phase self-detection comprising:

M switching circuits, each of the switching circuits having an input end and an output end, wherein N inductors are respectively coupled in parallel between the input ends and an input voltage, and the output ends are coupled to an output voltage;

a capacitor, coupled between the output voltage and a grounding voltage; and a control circuit, controlling conduction/cut-off status of the switching circuits according to a feedback voltage corresponding to the output voltage; and wherein the detecting circuit is coupled between the input ends and the control circuit, the detecting circuit detects the conduction status between the input voltage and each of the input ends, for outputting a first control signal accordingly;

wherein the control circuit selectively controls at least one of the switching circuits according to the first control signal, M is a positive integer which is greater than one, N is a positive integer less than or equal to M.

12. The detecting circuit according to claim 11, wherein the detecting circuit comprises:

M detecting units, wherein the detecting units are sequentially coupled to one of the input end, and each detecting unit detects the conduction status of the corresponding input end, for outputting a second control signal accordingly; and a processing unit, coupled between the detecting units and the control circuit, and the processing unit converting the received second control signals to the first control signal presented in M bits and outputting the first signal to the control circuit.

13. The detecting circuit according to claim 12, wherein each of the detecting units outputs the second control signal with voltage level of logic high voltage level to the processing unit when the detecting unit determines the corresponding input end and the input voltage are conducted with each other, each of the detecting units outputs the second control signal with voltage level of logic low voltage level to the processing unit when the detecting unit determines the corresponding input and the input voltage are not conducted with each other.

14. The detecting circuit according to claim 13, wherein the processing unit sequentially determines the bit values of M bits of the first control signal according to the voltage levels of the second control signals which is logic high voltage level or logic low voltage level.

15. The detecting circuit according to claim 14, wherein each detecting unit comprises:

a RS flip-flop, a set end and a reset end of the RS flip-flop respectively receiving a first enable signal and a reset signal, a positive output end of the RS flip-flop outputting the second control with voltage level of logic high voltage level when the reset signal is not true;

a pulse generator, outputting a pulse signal according to a falling edge trigger of the first enable signal;

a OR gate, outputting a third control signal according to the pulse signal and the output signal of an inverted output end of the RS flip-flop;

a third switching transistor, a drain end and a source end of the third switching transistor respectively coupled to the corresponding input end and the grounding voltage, a gate end of the third switching transistor being controlled by the third control signal for determining the conduction/cut-off status of the third switching transistor;

a fourth switching transistor, a drain end and a source end of the fourth switching transistor respectively coupled to a current source and the input voltage, a gate end of the fourth switching transistor coupled to the corresponding input end, the fourth switching transistor being controlled by the signal on the corresponding input end for determining the conduction/cut-off status of the fourth switching transistor; and an AND gate, outputting the reset signal according to the signal on the drain end of the fourth switching transistor and a second enable signal.

16. The detecting circuit according to claim 15, wherein the first enable signal is used to generate a falling edge when the voltage of the input voltage reaches a first threshold.

* * * * *